United States Patent [19]

Stuetz

[11] Patent Number: 4,624,872

[45] Date of Patent: Nov. 25, 1986

[54] LIQUID CRYSTALLINE POLYMER SUBSTRATES WITH ORTHOGONAL MOLECULAR ORIENTATION

[75] Inventor: Dagobert E. Stuetz, Watchung, N.J.

[73] Assignee: Celanese Corporation, New York, N.Y.

[21] Appl. No.: 640,477

[22] Filed: Aug. 13, 1984

[51] Int. Cl.$^4$ .................. C09K 19/38; H01S 3/10
[52] U.S. Cl. ...................... 428/1; 252/299.01; 372/21; 307/425
[58] Field of Search ............ 252/299.01, 299.7; 528/193; 428/1; 350/330, 390; 372/7, 21, 22; 307/425

[56] References Cited

U.S. PATENT DOCUMENTS

| | | | |
|---|---|---|---|
| 3,688,124 | 8/1972 | Freund et al. | 372/22 |
| 4,067,852 | 1/1978 | Calundann | 528/193 |
| 4,118,372 | 10/1978 | Schaefgen | 528/193 |
| 4,238,598 | 12/1980 | Favstritsky | 528/193 |
| 4,384,016 | 5/1983 | Ide et al. | 428/1 |
| 4,412,059 | 10/1983 | Krigbaum et al. | 428/215 |

OTHER PUBLICATIONS

Gutierrez et al, Polymer Papers, 1983, 24, 937–42.
Meredith et al, Macromolecules, 1982, 15, 1385–89.

Primary Examiner—Teddy S. Gron
Assistant Examiner—Jack Thomas
Attorney, Agent, or Firm—Depaoli & O'Brien

[57] ABSTRACT

In one embodiment this invention provides a polymeric, nonlinear optical medium comprising a thin substrate of wholly aromatic thermotropic liquid crystal polymer having an uniaxial orthogonal molecular orientation.

11 Claims, No Drawings

LIQUID CRYSTALLINE POLYMER SUBSTRATES WITH ORTHOGONAL MOLECULAR ORIENTATION

BACKGROUND OF THE INVENTION

Recent developments in the field of nonlinear optics are directed to prospective applications in optical information processing, telecommunications, and integrated optics.

Nonlinear optics deal with the interaction of light waves due to an electromagnetic field dependent susceptibility of an optically transparent substrate. Nonlinear optical effects are observed at light intensities which are sufficiently high that the electric field of the light waves is significant in comparison with the Coulomb electric field binding the electrons in the atoms and molecules of the light transmitting solid medium. Monochromatic light of the required intensity (e.g., $10^7$ V/cm) first became available with the discovery of the laser in 1960.

Laser frequency converters typically are based on inorganic crystals that respond nonlinearly to incident high-power optical radiation by changing the frequency of the radiation. Second harmonic generation (SHG) results when optical radiation passes through a transparent substrate having an electric susceptibility that is a nonlinear function of the intensity of the radiation. In principle, any optically transparent solid medium without inversion symmetry can produce second harmonic generation, providing that an electric field E of the electromagnetic radiation is sufficiently large.

Under certain conditions, the polarization of the electron distribution is proportional to the square of E, and a polarization wave is produced that is different from the input wave $\omega$. The constant of proportionality is called the second order nonlinear susceptibility coefficient. Efficient second order generation depends not only upon this nonlinearity, but also upon matching the velocity of the fundamental wave $\omega$ and second harmonic $2\omega$ of electromagnetic waves that propagate through the nonlinear medium.

Thus, a light transmitting solid medium must satisfy two structure requirements in order to achieve second harmonic generation and other second-order effects. First, the optical medium must not be symmetrical about a center point. The nonlinear second order susceptibility extinguishes in an optical medium that possesses a centrosymmetric structure. Second, for maximum second harmonic generation the optical medium must possess propagation directions whereby the optical medium birefringence cancels the natural dispersion, leading to a state of equal indicies of refraction at the fundamental and second harmonic frequencies. The phase matching can provide a high percentage of conversion of the incident light to the second harmonic wave.

In Laser Focus, vol. 18 (No. 2), February 1982, Garito et al describe optical nonlinearity in organic materials. Microscopic second order susceptibilities ($\beta$) for aniline, nitrobenzene, p-nitrobenzene and 2-methyl-4-nitroaniline are evaluated. The advantages of organic polymers are discussed in comparison with other organic compounds employed in molecular crystals. Polymers exhibit high mechanical strength and chemical stability.

Attachment of an optically nonlinear molecular group to a polymer chain provides two desirable features, i.e., a large nonlinear optical susceptibility in a solid medium that is noncentrosymmetric. In addition, the highly anisotropic nature of polymer crystals tends to exhibit a natural birefringence, which facilitates phase matching in second harmonic generation.

U.S. Pat. No. 4,431,263 describes nonlinear optical materials based on polymerized diacetylenes. There is detailed elaboration of physical and theoretical principles which underlie nonlinear behavior in organic systems. Reference is made to Physical Review A, 20 (No. 3), 1179 (1979) by Garito et al, entitled "Origin of the Nonlinear Second-Order Optical Susceptibilities of Organic Systems".

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C., 1983.

One aspect of nonlinear optical organic system research involves the investigation of external field induced dipolar alignment of molecules in a substrate such as a thin film. This has been demonstrated to occur for a guest dye in a polymer host when an electric field is applied to the organic mixture above the glass transition temperature of the polymer host. Noncentrosymmetric polar structures in organic crystals and molecular aggregates have been achieved in this manner. Other alignment methods are based on shear-induced uniaxial orientation of polymeric films and fibers.

Macromolecules, 15, 1385 (1982) by Meredith et al describes the preparation of films of a thermotropic liquid crystalline copolymer with mesogenic side chains doped (2% by weight) with the pleochroic dye 4-(dimethylamine)-4'-nitrostilbene (DANS). Orthoscopic examination of the films established that dc field induced alignment of the guest pleochroic dye molecules in the nematic polymeric host had been achieved, with about a 43° alignment scatter around the alignment director. Second harmonic generation measurements were made to establish the value of second-order nonlinear susceptibility. The reduced dimensionality of the nematic environment enhanced the dc field induced statistical dipole alignment of the dopant molecule as predicted by the Ising model.

Polymer Communications, 24, 364(1983) by Shibaev et al describes the study of the electric field orientation of liquid crystalline polymers having mesogenic side groups. The molecular orientation induced in a heated liquid crystalline polymeric film by an electric field was retained by cooling the polymeric substrate below the glass transition temperature. The oriented state of the film was stable after the removal of the electric field. Transparent polyacrylate films with homeotropic orientation of mesogenic side groups were prepared in this manner.

U.S. Pat. No. 4,412,059 describes a polymeric material which is capable of forming high modulus, biaxially orientable structures of a cholesteric mesophase. Among the applications contemplated for the novel organic composition are polymeric sheets or films having controlled variations in crystallite orientation due to the application of an external magnetic or electric field to the cholesteric phase prior to solidification.

There is continuing research effort to develop new nonlinear optical organic systems for prospective novel phenomena and devices for laser modulation and deflection, information control in optical circuitry, light valves and optical switches. The potential utility of organic materials with large second-order nonlinearities for very high frequency application contrasts with the bandwidth limitations of conventional inorganic electrooptic materials.

Accordingly, it is an object of this invention to provide novel polymeric substrates having uniaxially oriented molecular structures with a high degree of main chain alignment.

It is another object of this invention to provide optically clear films of thermotropic liquid crystalline polymer which are adapted for second harmonic generation applications.

It is a further object of this invention to provide novel liquid crystalline polymeric films and coatings possessing a unique combination of mechanical properties which are adapted for high strength-low weight applications.

Other objects and advantages of the present invention shall become apparent from the accompanying description and examples.

DESCRIPTION OF THE INVENTION

One or more objects of the present invention are accomplished by the provision of a thin substrate comprising a wholly aromatic thermotropic liquid crystal polymer having a uniaxial orthogonal molecular orientation of high uniformity.

In one embodiment, the present invention provides a thin substrate composition which is a wholly aromatic thermotropic liquid crystal polymer having a uniaxial orthogonal molecular orientation, and which is an optically clear film exhibiting nonlinear polarizability properties.

In another embodiment, the present invention provides a polymeric nonlinear optical medium comprising a film of thermotropic liquid crystal polymer having an external field-induced stable uniaxial orthogonal molecular orientation, wherein the polymer has a wholly aromatic chemical structure characterized by the recurring unit:

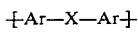

where X is a divalent radical selected from carbonyloxy, amido, azomethino, azo, azoxy, etheno and ethyno groups, and Ar is a divalent aromatic radical selected from phenylene, naphthylene and diphenylene groups, and aromatic radicals corresponding to the formula:

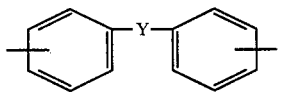

where Y is a carbonyl, sulfono, oxy or thio group.

In another embodiment, the present invention provides a laser frequency converter device with a polymeric nonlinear optical component comprising a thin medium of wholly aromatic thermotropic liquid crystal polymer having a uniaxial orthogonal molecular orientation.

In a further embodiment, the present invention provides an article of manufacture having a surface area coated with a self-adhering polymer film comprising a wholly aromatic thermotropic liquid crystal polymer having a uniaxial orthogonal molecular orientation.

The term "thin substrate" as employed herein refers to a continuous phase solid film, sheet or coating which has a thickness between about 10–500 microns.

The term "wholly aromatic" as employed herein refers to a linear thermotropic liquid crystalpolymer in which each recurring monomeric unit contributes at least one aromatic nucleus to the polymer backbone.

The term "thermotropic" as employed herein refers to polymers which are liquid crystalline (i.e., anisotropic) in the melt phase.

The term "orthogonal" as employed herein refers to an alignment or orientation of rod-like liquid crystal polymer molecules with directional axes perpendicular to the plane of a sheet, film or coating substrate. For purposes of the present invention embodiments, a substrate is in an orthogonal molecular configuration if at least about 90 percent of the liquid crystal polymer molecules are uniaxially aligned within about 10 degrees of perpendicular to the substrate plane.

The term "optically clear" as employed herein refers to a solid medium which is transparent or light transmitting with respect to incident fundamental light frequencies and harmonic light frequencies. In a laser frequency converter, a present invention nonlinear optical lens medium is transparent to both the incident and exit light frequencies.

The term "external field" as employed herein refers to an electric or magnetic field which is applied to a substrate of mobile thermotropic liquid crystal polymer molecules, to induce dipolar alignment of the polymer molecules parallel to the field.

The term "self-adhering" as employed herein refers to a polymer coating on a surface or sheet in a laminate structure which strongly adheres to the adjacent contacting surface without an interface of adhesive aid.

Liquid Crystal Polymers

Preferred thermotropic liquid crystal polymers are those which are capable of forming an anisotropic melt phase at a temperature below about 350° C.

Illustrative of suitable wholly aromatic thermotropic liquid crystal polymers are those disclosed in U.S. Pat. Nos. 3,493,522; 3,493,524; 3,503,739; 3,516,970; 3,516,971; 3,526,611; 3,991,013; 4,048,148; 4,057,597; 4,066,620; 4,067,852; 4,075,262; 4,083,829; 4,107,143; 4,118,372; 4,122,070; 4,130,545; 4,146,702; 4,153,779; 4,156,070; 4,159,365; 4,161,470; 4,169,933; 4,181,792; 4,184,996; 4,188,476; 4,219,461; 4,224,433; 4,230,817; 4,238,598; 4,238,599; 4,256,624; 4,332,759; and 4,381,389; incorporated herein by reference.

The wholly aromatic polyesters which are preferred for utilization in the present invention can be synthesized by a variety of ester-forming techniques. For example, the functional groups of the organic monomer compounds may be carboxylic acid groups, hydroxyl groups, ester groups, acyloxy groups, acid halides, and the like. The organic monomer compounds can be reacted in the absence of a heat exchange fluid via a melt acidolysis procedure. The monomers can be heated initially to form a melt solution of the reactants with the reaction continuing as solid polymer particles are suspended therein. A vacuum can be applied to facilitate removal of volatiles formed during the final stage of the condensation (e.g., acetic acid or water).

U.S. Pat. No. 4,083,829 describes a slurry polymerization process which can be employed to form the wholly aromatic polyesters which are preferred for use in the present invention. In this process, the solid product is suspended in a heat exchange medium.

When employing either the melt acidolysis procedure or the slurry procedure of U.S. Pat. No. 4,083,829, the organic monomer reactants from which the wholly aromatic polyesters are derived can be initially provided in a modified form whereby the usual hydroxy groups of such monomers are esterified (i.e., they are provided as lower acyl esters). The lower acyl groups preferably have about 2–4 carbon atoms.

Representative catalysts which optionally can be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), and the like. The quantity of catalyst utilized typically is about 0.001–1 percent by weight based upon the total monomer weight.

The wholly aromatic polyesters typically exhibit a weight average molecular weight of about 2,000–200,000, and preferably about 10,000–50,000. Molecular weight can be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters commonly exhibit an inherent viscosity (I.V.) of at least approximately 2.0 dl/g, e.g., approximately 2.0–10.0 dl/g, when dissolved in a concentration of 0.1 percent by weight in pentafluorophenol at 60° C.

A present invention thermotropic liquid crystal polymer can be formed into a sheet, film or other shaped form by conventional techniques.

In one method the polymer is dissolved in a suitable solvent such as N,N-dimethylacetamide, N-methylpyrrolidone, hexamethylphosphorictriamide, decalin, xylene, tetrahydrofuran, pentafluorophenol, hexafluoroisopropanol, and the like, and sprayed on a surface.

In another method the polymer is heated to its melt temperature and then extruded into the desired solid form. In another method a solution or melt is cast as a sheet or film, such as with a Doctor Blade procedure.

Techniques for shaping wholly aromatic thermotropic liquid crystal polymers are described in U.S. Pat. Nos. 4,245,084; 4,332,759; and references cited therein.

Poling of Liquid Crystal Polymers

The formation of a thin substrate of wholly aromatic thermotropic liquid crystals having a uniaxial orthogonal molecular orientation is achieved by inducing a dipolar alignment of the macromolecules in the substrate with an externally applied field.

In one method a thin film of the liquid crystalline polymer is cast between electrode plates. The liquid crystalline polymer substrate then is heated to a temperature between about the second order transition temperature and the isotropic clearing point. A dc electric field is applied (e.g., at a field strength between about 400–100,000 V/cm) for a period sufficient to align all of the macromolecules in a unidirectional orthogonal configuration parallel to the transverse field. Typically the orientation period will be in the range between about one second and one hour, as determined by factors such as polymer structure and field strength.

When the orientation of macromolecules is complete, the liquid crystalline polymer substrate is cooled below its second order transition temperature, while the substrate is still under the influence of the applied dc electric field. In this manner the uniaxial orthogonal molecular orientation of liquid crystal polymer is immobilized in a rigid structure.

The uniaxial orthogonal molecular orientation of the liquid crystalline substrate can be confirmed by X-ray diffraction analysis. Another method of molecular orientation measurement is by optical characterization, such as optical absorption measurements by means of a spectrophotometer with a linear polarization fixture.

Optical Properties

A present invention liquid crystal polymer substrate as previously described typically is an optically clear film which exhibits third-rank tensorial properties such as second harmonic generation and the linear electrooptic (Pockels) effect. The bulk phase of the polymeric substrate does not possess a real or orientational average inversion center. The substrate is a noncentrosymmetric dipolar structure.

Second harmonic generation measurements relative to quartz can be performed to establish the value of second-order nonlinear susceptibility (e.g., a value of about $3 \times 10^{-9}$ esu) of the optically clear substrates.

A suitable apparatus for second harmonic generation is schematically represented in Macromolecules, 15, 1386(1982). The apparatus is a Q-switched $Nd^{3+}/YAG$ laser configured as an unstable resonator with polarization output coupling. The laser is operated just above threshold, supplying 2–5 mJ per pulse of 1.06-$\mu$m radiation, which is focused on the surface of the thin substrate (20–30 $\mu$m thickness). Variation of the laser polarization is accomplished with a double-quarter wave rhomb rotator. The harmonic light is collected with f/16 optics, filtered from the fundamental light, and passed through a 20-cm focal length grating monochromator with an 8-nm bandwidth. Detection is accomplished with an 11-stage amplified photomultiplier tube. The system is integrated with a computer-controlled gated electronic detection and digitization apparatus.

Mechanical Properties

A present invention wholly aromatic thermotropic liquid crystal polymeric substrate with a uniaxial orthogonal molecular orientation structure exhibits exceptional mechanical properties, as compared to the same substrate which has a random molecular configuration rather than a dipolar unidirectional molecular configuration.

A present invention thin sheet or film is characterized by a high tensile modulus. Further, if the molecularly oriented liquid crystal polymer is in the form of a coating or laminate sheet which is in contact with a metal, plastic or glass surface, there is a tenacious self-adhesion between the liquid crystal polymer substrate and the surface of contact, as compared with the same liquid crystal substrate which has a random molecular configuration.

The following Examples are further illustrative of the present invention. The specific ingredients and processing parameters are presented as being typical, and various modifications can be derived in view of the foregoing disclosure within the scope of the invention.

EXAMPLE I

This Example illustrates the preparation of a wholly aromatic thermotropic liquid crystal polyester in accordance with U.S. Pat. No. 4,161,470.

To a three-neck, round flask equipped with a stirrer, argon inlet tube, and a heating tape wrapped distillation head connected to a condenser are added the following:

(a) 67.5 grams p-acetoxybenzoic acid (0.375 mole), and
(b) 28.7 grams 6-acetoxy-2-naphthoic acid (0.125 mole).

The charged flask is vacuum purged with argon and brought to a temperature of 250° C. At 250° C. the reaction solution is stirred rapidly under a slow stream of dry argon while acetic acid is distilled from the polymerization vessel.

The polymerization mixture is stirred for three hours at 250° C., and then for 1.25 hours at 280° C. About 24 ml of acetic acid are collected during these stages. The polymerization temperature is increased to 320° C., and held for 25 minutes at 320° C. under an argon flow and then subjected to a series of reduced pressure stages. During these stages the polymer melt continues to increase in viscosity and is stirred more slowly while the remaining acetic acid is removed from the reaction vessel. Upon cooling, the polymer is finely ground and dried in a forced air oven at 150° C.

The resulting wholly aromatic polyester has an inherent viscosity (I.V.) of 5.7 as determined in a pentafluorophenol solution of 0.1 percent by weight concentration at 60° C.

When the polymer is subjected to differential scanning calorimetry (DSC), it exhibits a sharp melt endotherm at about 302° C. (peak), which repeats at about 302° C. on subsequent remelt scans. The polymer melt is thermotropic. When the melt is cooled in the differential scanning calorimeter at a rate −20° C./minute, a sharp polymer crystallization exotherm is observed at about 270° C. (peak).

EXAMPLE II

This Example illustrates the preparation of a thin substrate of wholly aromatic thermotropic liquid crystal polymer with an orthogonal molecular orientation in accordance with the present invention.

A copolymer of p-hydroxybenzoic acid and 6-hydroxy-2-naphthoic acid as described in Example I is compression molded to form a film of about 500 micron thickness.

The molding is accomplished in a 30 Ton press (Wabash Metal Products, Inc., Model #30-1010-2TMX) with programmed heating and cooling, and adjustable pressure. The platen temperature is set at 290° C. The polymer in particulate form is placed between two Kapton (DuPont polyimide) sheets and positioned between the two platens. The platens are closed and 6 tons pressure is applied for 2 minutes. The platens are then cooled to 230° C. within thirty seconds, the pressure is released, and the film sample is retrieved from the press.

X-ray diffraction patterns from this film sample, recorded by using nickel filtered $CuK_\alpha$ radiation and flat plate photographic techniques, indicate a random orientation of polymer molecule axes.

Molecular alignment of the polymer molecules axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. This sub-assembly is covered on top and bottom with a double layer of Kapton sheets of 0.002 inch thickness and providing a 0.004 inch electrical insulating layer against each platen.

The whole assembly is placed between the platens of the press previously employed for preparing the unoriented precursor film sample. The platens are preheated to 290° C., then closed and a pressure of 6 tons is applied. Wires from a DC power supply are attached to the rods of the electrode plates and a voltage of 700 V is applied for one hour while maintaining temperature and pressure.

The press is cooled rapidly to 150° C. while pressure and voltage are maintained. At that temperature, the voltage is reduced to zero and the pressure released. The molecularly aligned film sample is retrieved from the mold, and X-ray diffraction patterns are recorded with nickel filtered $CuK_\alpha$ radiation and wide-angle photographic flat plate techniques. Orientation functions are determined utilizing a polar table and a microdensitometer interfaced with a LeCray computer. The measurements obtained from the <110> reflection indicate a spread of angular orientation of 9.10° around a director perpendicular to the film plane (i.e., in the direction of the DC field applied in the mold), and a Hermans Orientation function of 0.96.

The data demonstrate that the molecular alignment process results in a rotation of essentially all of the molecular axes of the polymer molecules out of the film plane into a direction orthogonal to the film plane. This type of molecularly aligned liquid crystal polymer film is noncentrosymmetric and can function as a nonlinear optical medium for a high intensity light field to which the medium is optically clear, e.g., as the nonlinear optical component in a laser frequency converter device.

EXAMPLE III

This Example illustrates a further embodiment for the preparation of a thin substrate of wholly aromatic thermotropic liquid crystal polymer with an orthogonal molecular orientation in accordance with the present invention.

A quantity of the same liquid crystal polymer as employed in Example II is extruded at 275° C. to form a film sample. X-ray diffraction analysis indicates that the polymer molecule axes are oriented in the film plane, in the extrusion direction with an angular spread of 7.5°.

Employing the external field molecular alignment procedure of Example II, except at a temperature of 285° C., the polymer molecule axes in the film are realigned to an orthogonal orientation. The angular spread of the molecule axes is about 10° from perpendicular.

What is claimed is:

1. A thin substrate comprising a wholly aromatic thermotropic liquid crystal polymer having a uniaxial orthogonal molecular orientation within about 10 degrees of perpendicular to the substrate plane.

2. A thin substrate in accordance with claim 1 wherein the substrate is an optically clear film which exhibits nonlinear polarizability properties.

3. A polymeric nonlinear optical medium comprising a film of thermotropic liquid crystal polymer having an external field-induced stable uniaxial orthogonal molecular orientation within about 10 degrees of perpendicular to the film plane, wherein the polymer has a wholly aromatic chemical structure characterized by the recurring unit:

—Ar—X—Ar— where X is a divalent radical selected from estero, amido, azomethino, azo, azoxy, etheno and ethyno groups, and Ar is a divalent aromatic radical selected from phenylene, naphthylene and diphenylene groups, and aromatic radicals corresponding to the formula:

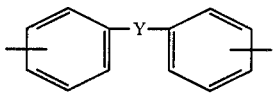

where Y is a carbonyl, sulfono, oxy or thio group.

4. A polymeric nonlinear optical medium in accordance with claim 3 wherein the film has a thickness between about 10–500 microns.

5. A polymeric nonlinear optical medium in accordance with claim 3 wherein the thermotropic liquid crystal polymer is a wholly aromatic polyester.

6. A polymeric nonlinear optical medium in accordance with claim 3 wherein the thermotropic liquid crystal polymer is a copolymer of p-hydroxybenzoic acid and 6-hydroxy-2-naphthoic acid.

7. A laser frequency converter device with a polymeric nonlinear optical component comprising a thin medium of wholly aromatic thermotropic liquid crystal polymer having a uniaxial orthogonal molecular orientation within about 10 degrees of perpendicular to the thin medium plane.

8. A laser frequency converter device in accordance with claim 7 wherein the liquid crystal polymer is a copolymer of p-hydroxybenzoic acid and 6-hydroxy-2-naphthoic acid.

9. An article of manufacture having a surface area coated with a self-adhering polymer film comprising a wholly aromatic thermotropic liquid crystal polymer having a uniaxial orthogonal molecular orientation within about 10 degrees of perpendicular to the film plane.

10. An article of manufacture in accordance with claim 9 wherein the surface area is metal.

11. An article of manufacture in accordance with claim 9 wherein the liquid crystal polymer is a copolymer of p-hydroxybenzoic acid and 6-hydroxy-2-naphthoic acid.

* * * * *